(12) United States Patent
Gniesmer et al.

(10) Patent No.: US 9,518,531 B2
(45) Date of Patent: Dec. 13, 2016

(54) PISTON FOR INTERNAL COMBUSTION ENGINES

(71) Applicants: Volker Gniesmer, Alfed (DE); Emmerich Ottliczky, Forchtenberg-Ernsbach (DE); Gunter Bayer, Mockmuhl (DE)

(72) Inventors: Volker Gniesmer, Alfed (DE); Emmerich Ottliczky, Forchtenberg-Ernsbach (DE); Gunter Bayer, Mockmuhl (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 0 days.

(21) Appl. No.: 14/363,494

(22) PCT Filed: Nov. 6, 2012

(86) PCT No.: PCT/EP2012/071885
§ 371 (c)(1),
(2) Date: Jun. 6, 2014

(87) PCT Pub. No.: WO2013/083342
PCT Pub. Date: Jun. 13, 2013

(65) Prior Publication Data
US 2015/0176522 A1    Jun. 25, 2015

(30) Foreign Application Priority Data

Dec. 9, 2011    (DE) .................. 10 2011 088 066

(51) Int. Cl.
*F02F 3/00*    (2006.01)
*F02F 3/22*    (2006.01)
(Continued)

(52) U.S. Cl.
CPC ............. *F02F 3/003* (2013.01); *B23P 15/10* (2013.01); *F02F 3/16* (2013.01); *F02F 3/22* (2013.01);
(Continued)

(58) Field of Classification Search
CPC .............. F05C 2201/021; F05C 2201/0448; F02F 3/22; F02F 3/00; F02B 3/06
(Continued)

(56) References Cited

U.S. PATENT DOCUMENTS 6,155,157 A    12/2000  Jarrett
2006/0207424 A1    9/2006  Gaiser

FOREIGN PATENT DOCUMENTS

DE    20041061778 A1    4/2006
DE    102009015820 A1    7/2010
(Continued)

*Primary Examiner* — Lindsay Low
*Assistant Examiner* — Charles Brauch
(74) *Attorney, Agent, or Firm* — Young Basile Hanlon & MacFarlane, P.C.

(57) ABSTRACT

A piston of an internal combustion engine, includes a piston upper part and a piston lower part which are supported via corresponding joining webs, in each case forming a joining zone connected in a material-to-material manner by means of a multi-orbital rotary friction weld. The joining webs and which are in each case directly connected have a wall thickness S1, S2 which is identical as far as possible. The piston encloses a combustion-chamber recess and at least one cooling duct which are made centrally or eccentrically in the piston. The combustion chamber recess and the cooling duct form a circular contour or a contour which deviates from a circular shape.

15 Claims, 2 Drawing Sheets

(51) Int. Cl.
*B23P 15/10* (2006.01)
*F02F 3/16* (2006.01)
*F02B 3/06* (2006.01)

(52) U.S. Cl.
CPC .. *F02B 3/06* (2013.01); *F02F 3/00* (2013.01); *F02F 2003/0061* (2013.01); *F02F 2200/04* (2013.01); *F05C 2201/021* (2013.01); *F05C 2201/0448* (2013.01); *Y10T 29/49275* (2015.01)

(58) Field of Classification Search
USPC ...................................................... 123/193.6
See application file for complete search history.

(56) References Cited

FOREIGN PATENT DOCUMENTS

| | | |
|---|---|---|
| WO | WO 2009106200 A1 * | 9/2009 |
| WO | 2010075959 A1 | 7/2010 |

* cited by examiner

PISTON FOR INTERNAL COMBUSTION ENGINES

BACKGROUND

The disclosure relates to a piston for an internal combustion engine configured as a single-piece cooling duct piston in accordance with its production and which comprises a piston upper part and a piston lower part that are connected in a material-to-material manner by welding.

U.S. Pat. No. 6,155,157 shows a cooling duct piston with two components that can be produced separately which are subsequently joined together in a material-to-material manner by means of a friction welding process to form a single-piece cooling duct piston. DE 10 2004 061 778 A1 relates to a cooling duct piston consisting of an upper part and a lower part that are supported by matching joining webs running rotationally symmetrically and spaced apart radially. Friction welding of joining zones achieves a material-to material connection of the inner joining webs. The radially outer joining webs are then joined using a separate welding procedure.

A piston is known from DE 10 2009 015 820 A1 that includes a combustion chamber recess introduced centrally in the piston crown, an inner cooling space and an outer cooling duct that are correspondingly arranged rotationally symmetrically. The piston upper part and the piston lower part are supported by joining webs, where joining zones of the joining webs are connected in a material-to-material manner by multi-orbital friction welding. The wall thickness of the joining webs running rotationally symmetrically changes over their longitudinal length.

In multi-orbital friction welding, the individual components are clamped, pressed against each other and oscillated. The joining partners are moved in circular orbital motions to create frictional heat and preferably oscillate in anti-phase whereby frictional energy is introduced into the joining zones. In contrast to previous friction welding processes, weld times are shortened and subsequent processes reduced using multi-orbital friction welding. Since the materials are joined in a plastic state with multi-orbital friction welding, the temperature level is below the melting temperatures of conventional friction welding.

It would be desirable to create a weight-optimized piston with improved cooling that can withstand higher thermal loads.

SUMMARY

The disclosure relates to a piston in which the combustion chamber recess and/or cooling duct is located centrically or eccentrically in the piston and accordingly have a circular shape or a shape deviating from a circle. The components, namely, the piston upper part and the piston lower part, are supported by joining webs running centrically or eccentrically or conforming to the contour of the combustion chamber recess and/or of the cooling duct. The respective matching joining webs are connected in a material-to-material manner using multi-orbital friction welding in the area of the joining zone. Irrespective of the location of the combustion chamber recess in the piston, the lateral joining web demarcating the cooling duct from the combustion chamber recess and the outer joining web enclosing the piston ring belt have a continuously identical wall thickness. Furthermore, it is practical for the wall thicknesses of all joining webs in the piston to match or at least to be designed identically as far as possible. Advantageously under the invention the dimensioning of the joining webs can additionally be adapted to the thermal and mechanical loads occurring in the individual regions of the piston. Through the joining webs or walls, dimensioned solely for adequate piston durability, a weight-optimized piston can be realized because of reduced wall thicknesses. At the same time, because of optimized wall thicknesses, improved heat transfer results and consequently a drop in temperature in conjunction with an improved cooling effect that advantageously increases the service life of the piston. Using the present concept, a piston can be created that meets the requirements regarding thermal and mechanical loading and satisfies demands for a reduction of rotatory or oscillating masses in contemporary internal combustion engines. The joining technology applied, i.e., multi-orbital friction welding, with which the highest degree of joining quality can be achieved even with thin-wall joining webs running eccentrically, simplifies production of the piston. Because of the extremely small, circular movements of all the joining partners, an advantageously synchronous, simultaneous connection of joining webs in relatively closely spaced joining zones is possible. In addition, this joining technology promotes design freedom regarding the position, the alignment and the wall thickness of joining webs and of the resulting joining zones.

The application of multi-orbital friction welding advantageously permits time-optimized and cost-optimized, flexible piston manufacture, where the process also permits material-to-material joining of a piston upper part and a piston lower part that are produced from different materials. For example, a piston lower part produced from a lightweight material, such as one containing aluminum as the principal alloying element, can be joined to a piston upper part of steel or a ferrous material. In addition, multi-orbital friction welding can be used to join components that are produced by identical or different processes, for example, forging, pressing, casting or extrusion.

The process can additionally be transferred to a piston structure that forms two cooling zones integrated centrically or eccentrically in the piston, for example, an inner cooling space that is enclosed radially by a cooling duct, which are demarcated by joining webs of identical, or as identical as possible, wall thickness spaced radially from each other. The position and geometric design of the cooling zones can be designed differently from each other. For example, it is practical to apply multi-orbital friction welding to join piston components that include an eccentric combustion chamber recess and a centric cooling duct. Underscoring the design freedom, it is further practical to arrange two joining zones spaced radially from each other in such a way that a vertical offset results. In addition, joining webs can be joined whose joining zone is aligned on an incline whereby no pressure in the vertical direction results during multi-orbital friction welding.

Multi-orbital friction welding can be used in addition for pistons whose joining webs or joining zones are circumferentially closed or are provided with at least one opening or a transfer passage to ensure coolant flow when the piston is in the operating state. Where possible, all joining web transitions, to the piston crown, for example, are designed with radii of the same size as a measure to improve component strength in the piston. Additionally, it is practical to provide at least individual joining webs locally with radially inward facing and/or radially outward facing stiffening ribs. The process further proposes a piston structure that includes an external recess or an external step below the ring belt to create an eccentric piston lateral surface. The advantageously minor weld beads that result in multi-orbital friction welding can remain on the outside after welding is complete or be removed if required by subsequent machining.

A method of producing a piston is proposed that includes the following steps. First, the components, namely, the piston upper part and the piston lower part, are produced as blanks, such as by forging, pressing, casting or extrusion. The centrically or eccentrically shaped combustion chamber recess is formed into the piston upper part with the subsequent pre-machining and the cooling space and/or the cooling duct formed into the piston upper part and the piston lower part in post-process machining. Then the piston upper part and piston lower part, which are supported by joining zones of joining webs, are joined by multi-orbital friction welding. Final machining and cleaning of the piston follows as the last step.

Different multi-orbital friction welding methods can be employed depending on the design of the individual piston components. With an axially identically shaped piston upper part and piston lower part whose eccentric combustion chamber recess and/or eccentric cooling duct were realized by pre-machining, a centric multi-orbital friction welding method can be used for the material-to-material joint. An axial offset between the piston upper part and the piston lower part in conjunction with almost any geometrically shaped combustion chamber recess and/or cooling duct requires an eccentric multi-orbital friction welding method to join these components.

BRIEF DESCRIPTION OF THE DRAWING

The following description explains different aspects depicted in FIGS. 1 to 4, in which.

DETAILED DESCRIPTION

Figure 1:
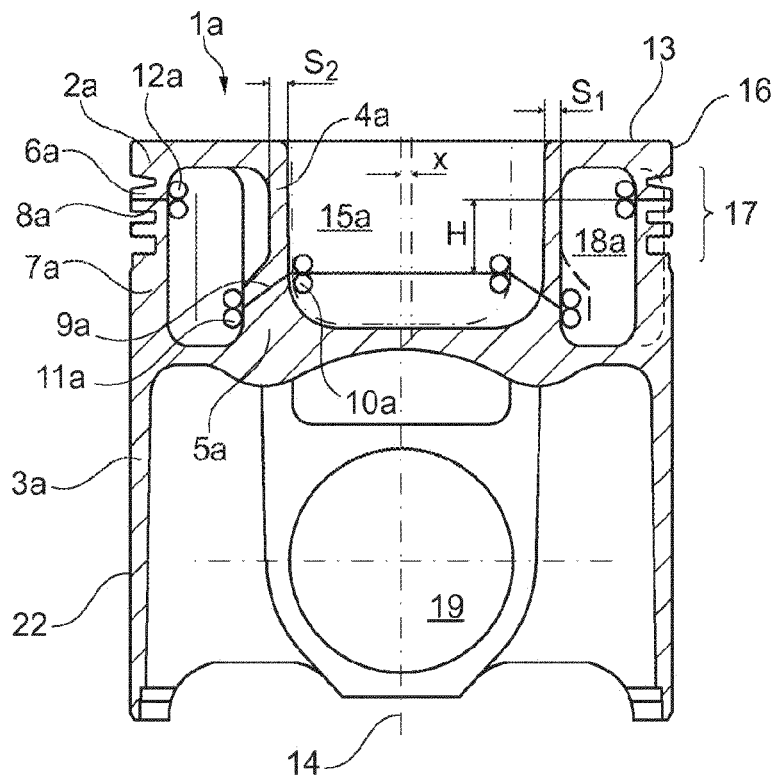
FIG. 1 shows a first aspect of a piston in accordance with the process in a cross-sectional drawing.

FIG. 1 depicts in cross-section a single-piece piston 1a that comprises a piston upper part 2a and a piston lower part 2b which are supported by joining webs 4a, 5a, 6a, 7a whose joining zones 8a, 9a are joined in a material-to-material manner by a multi-orbital friction welding process. Because of the very small circular orbital movements of the multi-orbital friction welding no or only minor weld beads 10a, 11a, 12a form in the region of the joining zones 8a, 9a that require no or only minor subsequent machining. The wall thickness $S_1$, $S_2$ of the joining webs 4a, 5a and the joining webs 6a, 7a is constant as far as possible over their longitudinal length. A vertical offset H results between joining zone 8a of joining webs 6a, 7a, which is aligned radially, and joining zone 9a of joining webs 4a, 5a, which aligned on an incline. The piston upper part 2a includes a combustion chamber recess 15 a formed in a piston crown 13 eccentrically to a piston axis 14, shown by the dimension X which illustrates an axial offset X that results between the piston axis 14 and a center axis of the combustion chamber recess 15a. The combustion chamber recess 15a is surrounded by a cooling duct 18a which is bounded on the radially inward side by the joining webs 4a, 5a and on the radially outward side by joining webs 6a, 7a, 4a, 5a. Joining webs 4a, 5a form an eccentric inner wall that is stepped in regions pointing towards the piston crown 13. On the peripheral side, the piston upper part 2a forms a top land 16 joined to which is a ring belt 17 that is intended to receive piston rings not shown in FIG. 1. The piston lower part 3a forms a piston skirt 22 in which two diametrically opposite piston pin bores 19 are inserted for a piston pin.

Figure 2:
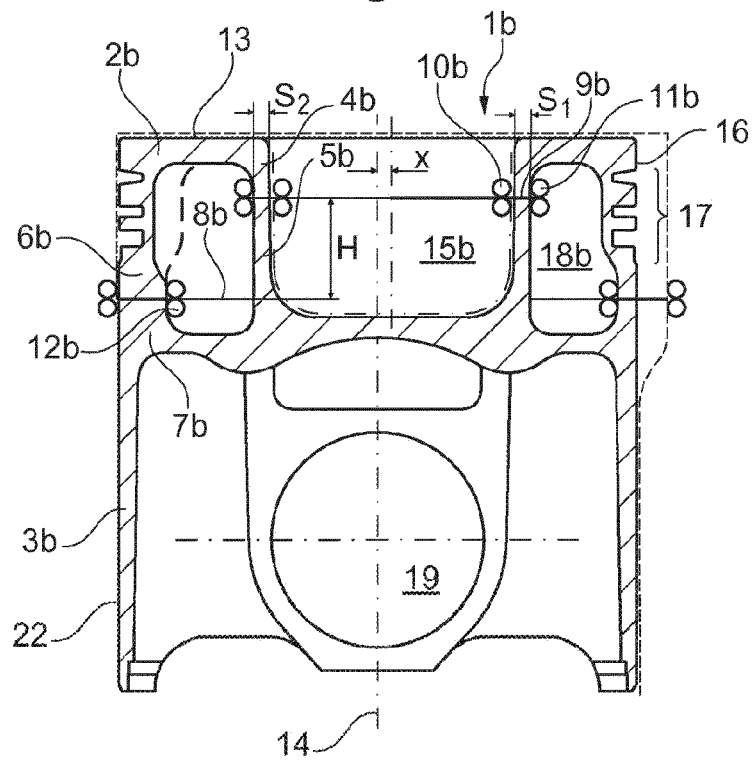
FIG. 2 shows a second aspect of a piston in accordance with the process.
Figure 3:
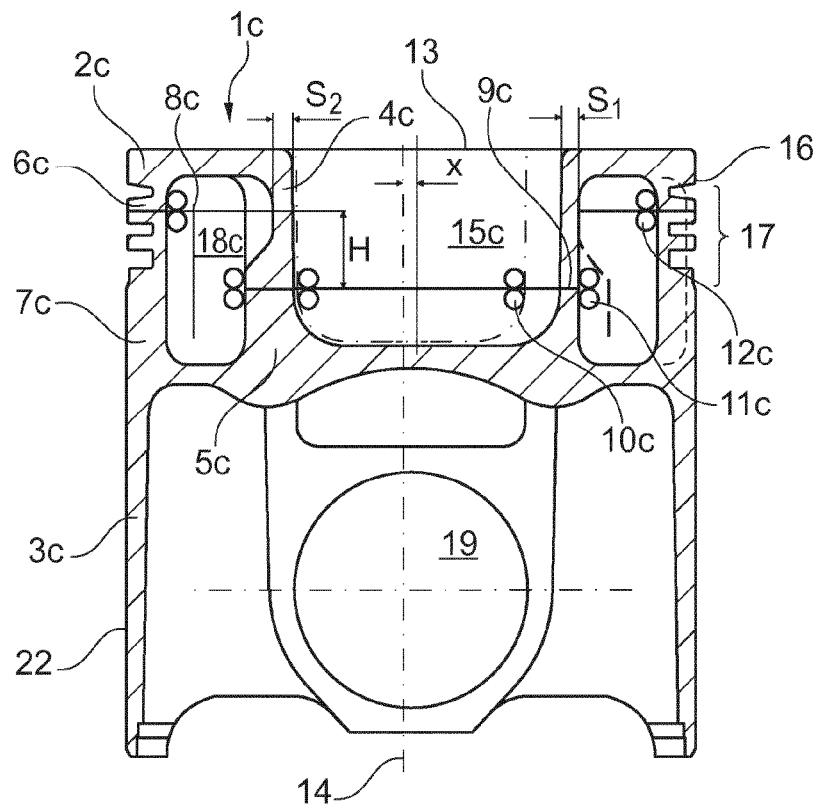
FIG. 3 shows a third aspect of a piston in accordance with the process.
Figure 4:
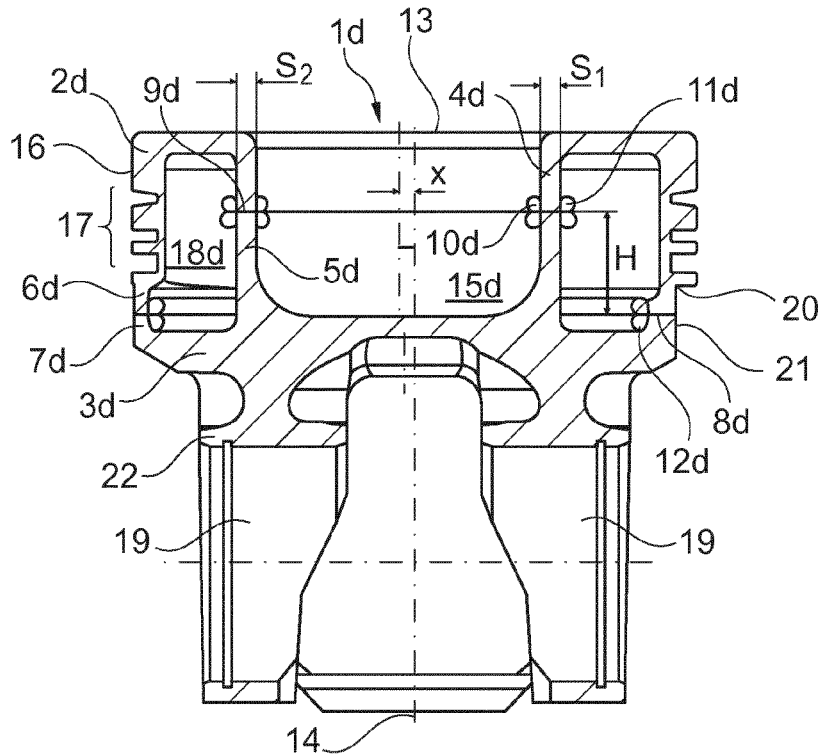
FIG. 4 shows a fourth aspect of a piston in accordance with the process.

FIGS. 2 to 4 illustrate alternative aspects of the piston, in which the same reference numerals are used for identical components to which a letter is assigned as an index to distinguish them. The following descriptions are essentially limited to distinguishing features compared with the piston from FIG. 1.

FIG. 2 shows piston 1b with an eccentric combustion chamber recess 15b that is surrounded by cooling duct 18b that has an almost constant cross-sectional profile for the cooling medium in spite of an asymmetrical layout on the peripheral side. To achieve this the cooling duct 18b pointing towards the piston pin bore 19 in the region of the smallest cross-section comprises a reduced wall thickness and on the opposite side a greater wall thickness for the joining webs 6b, 7b. The joining zones 8b, 9b, identically radially aligned and offset to each other vertically, are placed below the ring belt 17 and in the upper region of the combustion chamber recess 15b, differing from piston 1a.

Piston 1c is depicted in FIG. 3 whose structure matches piston 1a as far as possible. Diverging from the piston, the combustion chamber recess 15c forms an outer contour deviating from a circular form, illustrated by the course of a wall, areas of which are indicated by an additional dot-dash line. In addition, both joining zones 8c, 9c are aligned radially, whereby a modified, matched inner wall course results, formed by joining webs 4c, 5c of the cooling duct 18c.

FIG. 4 shows piston 1d in which the arrangement of the joining zones 8d, 9d between piston upper part 2d and piston lower part 3d matches piston 1b as far as possible. In the region of the greatest cross-sectional profile of the cooling duct 18d, piston 1d forms a radial step 20 on the outside below the ring belt 17, resulting in an eccentric lateral surface 21 for piston 1d.

What is claimed:

1. A piston for an internal combustion engine that is designed as a single-piece piston including a combustion chamber recess and at least one cooling duct, the piston having a piston upper part and a piston lower part that are supported by matching joining webs connected material-to-material using multi-orbital friction welding, comprising:
   the combustion chamber recess and the cooling duct both located eccentrically by an axial offset with respect to the piston center axis and have one of an identically circular shape or deviating from a circular shape, where the piston upper part and the piston lower part are supported by the joining webs of at least approximately a same wall thickness.

2. The piston from claim 1, wherein the piston upper part and the piston lower part are produced from one of an identical material or from different materials.

3. The piston from claim 1, wherein the piston comprises a piston upper part and/or piston lower part rendered as one of a forged or cast component.

4. The piston from claim 1, wherein the piston has an inner and an outer joining web spaced radially from each other and respectively positioned eccentric with respect to the piston axis defining respective inner and outer joining zones.

5. The piston from claim 1, wherein the eccentric position of the combustion chamber recess deviates from the eccentric position of the cooling duct with respect to the piston axis.

6. The piston from claim 4, wherein the inner and the outer joining zones are offset radially to each other, and form a vertical offset between the piston upper part and the piston lower part.

7. The piston from claim 4, wherein the inner joining zone is radially inclined from the cooling duct toward the combustion chamber.

8. The piston from claim 1, wherein the piston has an eccentric lateral surface with respect to the piston axis and forms a partial step below a ring belt.

9. The piston from claim 4, wherein, after completion of the friction welding, a resulting weld bead at the inner or outer joining zone remains or is removed.

10. A method for producing a piston for an internal combustion engine comprising:
producing a piston upper part and a piston lower part as one of forged or cast blanks;
pre-machining the piston upper part and the piston lower part that includes introducing a combustion chamber recess and cooling duct having an inner wall, the chamber recess and cooling duct positioned eccentrically by an axial offset with respect to a piston axis, a vertical portion of the cooling duct inner wall substantially following the contour of the chamber recess;
joining components on the same axis, including the piston upper part and the piston lower part, whose eccentric combustion chamber recess and/or eccentric cooling duct, are realized by pre-machining, using centric multi-orbital friction welding.

11. The method from claim 10, wherein provision is made for eccentric, multi-orbital friction welding for a material-to-material joining of the piston upper part and the piston lower part between which the axial offset exists.

12. The piston of claim 1 wherein the combustion chamber defines a radially outer contour that is not circular in shape with respect to a combustion chamber axis defined at the axial offset.

13. The piston of claim 1 wherein the cooling duct defines a radially outward peripheral wall, the cooling duct peripheral wall is asymmetrical with respect to a combustion chamber axis defined at the axial offset.

14. The method of claim 10 wherein the step of pre-machining the combustion chamber axis further comprises forming a chamber recess outer contour that is not circular in shape with respect to a combustion chamber axis defined at the axial offset.

15. The method of claim 10 wherein the step of pre-machining the cooling duct further comprises forming a cooling duct radially outward peripheral wall that is asymmetric to a combustion chamber axis defined at the axial offset.

* * * * *